2,921,066
Patented Jan. 12, 1960

2,921,066
SULFONAMIDES

Udo Wörffel, Wuppertal-Elberfeld, Robert Behnisch, Wuppertal-Vohwinkel, and Fritz Mietzsch, Wuppertal-Elberfeld, Germany, assignors to Farbenfabriken Bayer Aktiengesellschaft, Leverkusen, Germany, a corporation of Germany No Drawing. Application April 15, 1958
Serial No. 728,512

Claims priority, application Germany April 18, 1957

1 Claim. (Cl. 260—239.95)

This invention relates to a process of producing 5-(p-amino-benzene-sulfonamido)-1,2,4-thiodiazoles.

4-aminobenzene sulfonyl derivatives of 5-amino-1,2,4-thiodiazole are known which carry an alkyl group in the 3-position. They are produced from the corresponding 5-amino-1,2,4-thiodiazoles by reaction with benzene sulfonyl halides which have in the 4-position a substituent which can be converted into an amino group. The yields obtained in this way are very small and amount, for example, for 5-p-acetyl aminobenzene sulfamido-1,2,4-thiodiazole, to 14% of the theoretical (Chem. Berichte, 87 (1954), pages 57–67). This process is therefore not commercially useful.

We have found that these sulfathiodiazoles can be produced in good yields by heating 5-halogeno-1,2,4-thiodiazoles which carry in the 3-position a hydrogen atom or an alkyl, alkoxyalkyl, alkyl mercapto alkyl, aryl or aralkyl residue, with benzene sulfonamides which carry in the 4-position an amino group or a group convertible into an amino group, in the presence of an acid-binding agent, or with metal salts of the aforesaid sulfonamides, preferably in an inert diluent such as, for example, diphenyl ether, diphenyl methane, diphenyl, paraffin oil, etc. The most suitable reaction temperatures lie between 100 and 200° C. The yields according to our method amount to about 75% of the theoretical.

The reaction of sulfonamides with halogen substituted heterocyclic compounds is known. It has, however, been found no commercial application because it is far inferior to the usual method of carrying out the process from sulfochlorides and heterocyclically substituted amines (see for example F. Mietzsch and R. Behnisch, Therapeutisch verwendbare Sulfonamid- und Sulfonverbindungen, Verlag Chemie, 1955, page 60, Section 3). No case has yet become known in which the process of reacting sulfonamides with halogen-substituted heterocyclic compounds succeeds, while the usual process of production fails. The result of our method was therefore not to be foreseen and represents an important technical advance for the production of these therapeutics which are active against bacterial infections.

The following examples are given for the purpose of illustrating the invention.

Example 1

21.4 grams (0.1 mol) of p-acetyl-aminobenzene sulfonyl amide, 14 grams (0.1 mol) of anhydrous potassium carbonate and 1 gram of copper powder are suspended in 200 millilitres of diphenyl ether. The suspension is vigorously stirred at a bath temperature of 200° C. for 1½ hours while slowly adding dropwise 13.5 grams (0.1 mol) of 5-chloro-3-methyl-1,2,4-thiodiazole. Stirring is continued for a further ½ half hour the diphenyl ether is decanted off after cooling, the residue is dissolved in 300 millilitres of water at 60° C., filtered over charcoal and acidified (pH 4–5). The crystalline precipitate is filtered off with suction, washed with water and re-crystallised from 50% acetic acid. The 5-(4'-acetyl-aminobenzene sulfonamido)-3-methyl-1,2,4-thiodiazole is obtained in colorless crystals which melt with decomposition at 245–246° C. in a yield of 23 grams (74% of the theoretical).

Instead of diphenyl ether there may be used other high boiling inert diluents with the same result, e.g. diphenyl, diphenyl methane, paraffin oil, decahydronaphthalene, tetrahydronaphthalene and methyl- or chloro-naphthalene.

Instead of p-acetyl-aminobenzene sulfonyl amide and potassium carbonate the preformed potassium or sodium salt of the p-acetyl-amino sulfonyl amide may be used.

The reaction components may also be reacted without the addition of a suspension agent.

By saponification of the foregoing compound with 2N alkali metal hydroxide (1 hour at 50–100° C.) 5-(p-amino-benzene-sulfonamido)-3-methyl-1,2,4 - thiodiazole of the melting point 212–213° C. is obtained.

This compound also results directly by the analogous reaction of 5-chloro-3-methyl-1,2,4-thiodiazole with the sodium or potassium salt of p-aminobenzene sulfonyl amide.

Example 2

In a similar manner there are obtained from 58 grams (0.39 mol) of 5-chloro-3-ethyl-1,2,4-thiodiazole, 82.5 grams of p-acetyl-aminobenzene sulfonyl amide and 54 grams (0.39 mol) of potassium carbonate in 500 millilitres of diphenyl methane in the presence of 4 grams of copper powder—89 grams (70% of the theoretical) of 5-(4'-acetyl-aminobenzene sulfonamido)-3-ethyl-1,2,4-thiodiazole which melts with decomposition at 246–248° C.

The saponification of this compound with 2N alkali metal hydroxide leads to 5-(p-aminobenzene sulfonamido)-3-ethyl-1,2,4-thiodiazole which melts at 198–199° C.

In a corresponding manner by employing 4-nitro-benzene sulfonamide there are obtained the 5-(4'-nitrobenzene sulfonamido)-3-ethyl-1,2,4-thiodiazole in pale yellow crystals of the melting point 230° C. By reduction with iron according to Béchamps the compound is transformed into the above mentioned 4'-amino compound of the melting point 198–199° C.

Example 3

The operations of Example 1 are repeated, using as a thiodiazole constituent 5-chloro-3-n-propyl-1,2,4-thiodiazole having a boiling point of 74° C. at a pressure of 16 mm. and obtainable from butyr-amidine-hydrochloride and perchloromethyl mercaptane in the presence of sodium hydroxide according to German Patent 960,281. 5-(4'-aminobenzene sulfonamido)-3-n-propyl-1,2,4 - thiodiazole of the melting point 162–164° C. is obtained.

The 5 - (4'-aminobenzene sulfonamido) - 3 - isopropyl-1,2,4-thiodiazole of the melting point 198–199° C. is obtained in exactly the same manner starting from 5-chloro-3-isopropyl-1,2,4-thiodiazole of the boiling point 63° C. at a pressure of 13 mm., obtainable by condensation of isobutyramidine-hydrochloride and perchloromethyl mercaptane in the presence of sodium hydroxide.

Example 4

The operations of Example 1 are repeated, using as a thiodiazole constituent 5-chloro-3-β-methoxyethyl-1,2,4-thiodiazole (boiling point 96–98° C. at a pressure of 14 mm.), obtainable from β-methoxy-propionitrile via the amidine. 5 - (4' - aminobenzene sulfonamido)-3-β-methoxyethyl-1,2,4-thiodiazole of the melting point 179–181° C. is obtained.

The 5-chloro-3-β-ethoxyethyl - 1,2,4 - thiodiazole (boiling point 105–106° C. at a pressure of 13 mm.) yields the corresponding 5-(4'-aminobenzene sulfonamido)-3-β-ethoxyethyl-1,2,4-thiodiazole of the melting point 172–173° C.

*Example 5*

The operations of Example 1 are repeated, using as a thiodiazole constituent 5-chloro-3-phenyl-1,2,4-thiodiazole and yielding 5-(4'-aminobenzene sulfonamido)-3-phenyl-1,2,4-thiodiazole of the melting point 198–199° C.

Analogously 5-chloro-3-p-chlorophenyl-1,2,4-thiodiazole of the melting point 96° C., obtainable from p-chlorobenzonitrile yields 5-(4'-aminobenzene sulfonamido)-3-p-chlorophenyl-1,2,4-thiodiazole of the melting point 207–208° C.

*Example 6*

The operations of Example 1 are repeated, using as a thiodiazole constituent 5-chloro-3-benzyl-1,2,4-thiodiazole. The resultant 5-(4'-aminobenzene sulfonamido)-3-benzyl-1,2,4-thiodiazole has a melting point of 235–236° C.

Analogously 5-chloro-3-o-chlorobenzyl-1,2,4-thiodiazole (melting point 140–141° C. at a pressure of 2 mm.), obtained from o-chlorobenzlycyanide yields 5-(4'-aminobenzene sulfonamido)-3-o-chlorobenzyl-1,2,4-thiodiazole of the melting point 191–192° C.

5-chloro-3-p-chlorobenzyl-1,2,4-thiodiazole (boiling point 146–149° C. at a pressure of 3 mm.), obtainable from p-chlorobenzyl cyanide by the same reaction yields the 5-(4'-aminobenzene sulfonamido)-3-p-chlorobenzyl-1,2,4-thiodiazole of the melting point 226–227° C.

We claim:

5-(4'-aminobenzene sulfonamido)-3-ethyl-1,2,4-thiodiazole.

References Cited in the file of this patent

FOREIGN PATENTS

| | | |
|---|---|---|
| 116,021 | Australia | Oct. 15, 1942 |
| 873,472 | France | Mar. 23, 1942 |
| 876,296 | France | June 27, 1942 |
| 533,495 | Great Britain | Feb. 14, 1941 |

OTHER REFERENCES

Goerdeler: Chemische Berichte, vol. 87, pp. 57–67 (1954).

Northey: The Sulfonamides and Allied Compounds, ACS Monograph 106, p. 35, Reinhold Publishing Corp., 1948.